United States Patent [19]

Brown

[11] Patent Number: 4,635,394
[45] Date of Patent: Jan. 13, 1987

[54] BASKET FOR PLANTS

[76] Inventor: John A. Brown, 2604 Mountain Rd., Bartlesville, Okla. 74003

[21] Appl. No.: 703,462

[22] Filed: Feb. 21, 1985

Related U.S. Application Data

[63] Continuation of Ser. No. 615,685, Jun. 1, 1984, abandoned, which is a continuation of Ser. No. 429,821, Sep. 30, 1982, abandoned.

[51] Int. Cl.[4] .............................................. A47G 7/00
[52] U.S. Cl. ............................................ 47/67; 47/39
[58] Field of Search ................. 47/39, 66, 67, 47, 83, 47/82, 59; 248/27.8, 519

[56] References Cited

U.S. PATENT DOCUMENTS

| 101,918 | 4/1870 | Rogers | 47/39 |
|---|---|---|---|
| 283,840 | 8/1883 | Westphal | 47/39 |
| 585,486 | 6/1897 | Snow | 47/66 X |
| 1,419,152 | 6/1922 | Lansing et al. | 47/66 |
| 1,928,799 | 10/1933 | Stevens | 47/39 |
| 4,227,343 | 10/1980 | Espy et al. | 47/67 X |

FOREIGN PATENT DOCUMENTS

| 1267541 | 4/1972 | United Kingdom | 47/67 |
|---|---|---|---|
| 1444834 | 8/1976 | United Kingdom | 47/39 |

Primary Examiner—Robert A. Hafer
Assistant Examiner—Danton DeMille
Attorney, Agent, or Firm—Head, Johnson & Stevenson

[57] ABSTRACT

A plant container adapted to be either suspended from an overhead support structure or supported above a base means and comprising a container preferably constructed from a transparent plastic material, a centrally disposed elongated support rod also preferably constructed of a transparent plastic material and extending axially outwardly from the container, either downwardly therefrom or upwardly therefrom as desired, and bearing members interposed between the container and the support rod whereby the container is freely rotatably about the longitudinal axis of the support rod, a drain port provided in the bottom of the container and having one element of a quick-connect coupling sealingly secured therein, a hose member having a mating element of the quick-connect coupling secured to one end thereof, for selective engagement with the first mentioned element to receive water draining from the container during watering of the plant, and a capturing vessel in communication with the opposite end of the hose for receiving and storing the draining water therein.

4 Claims, 4 Drawing Figures

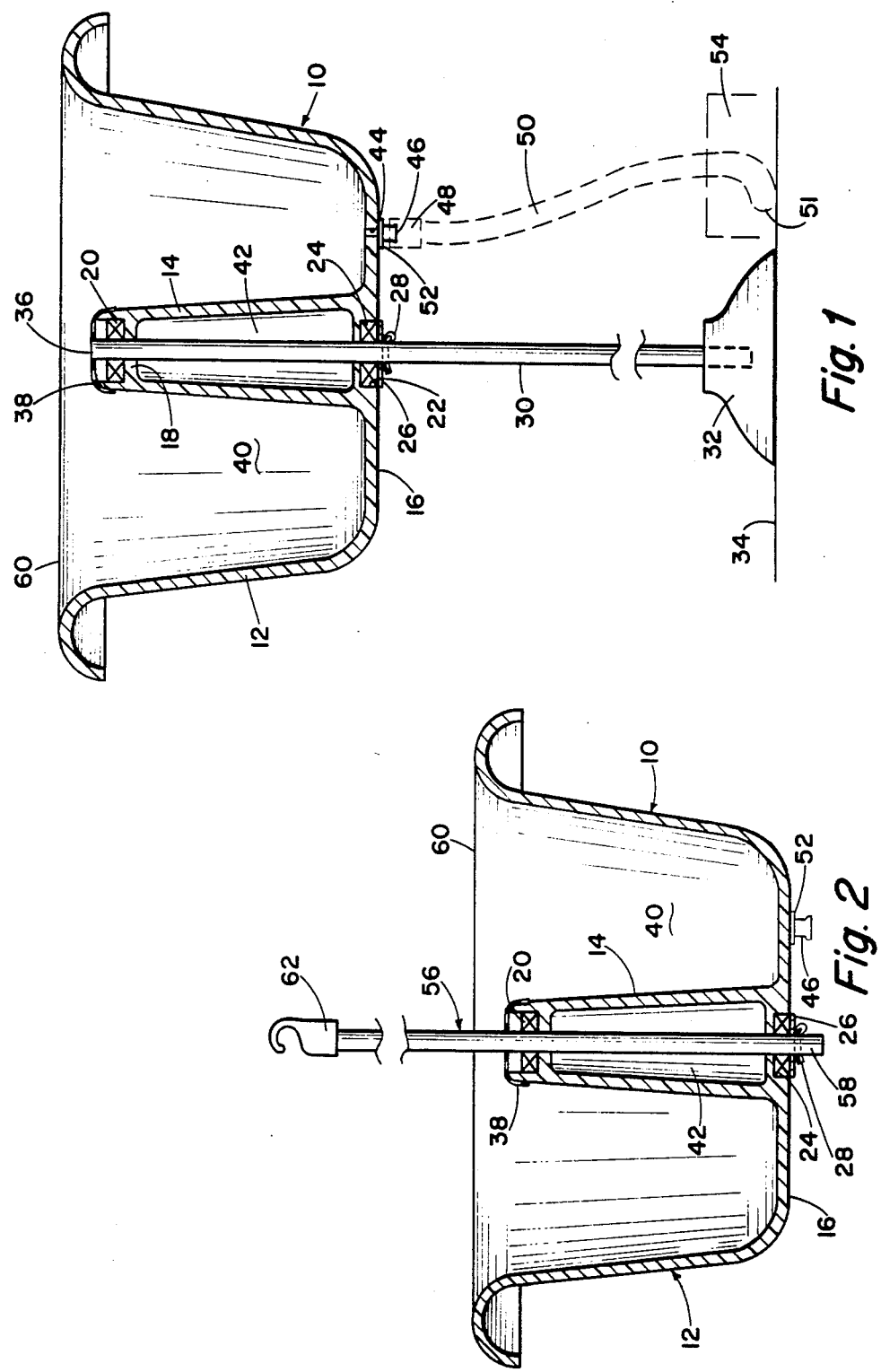

_4,635,394_

BASKET FOR PLANTS

CROSS-REFERENCE TO RELATED APPLICATIONS

This is a FWC continuation application of Ser. No. 615,685 now abandoned, filed June 1, 1984, which is a FWC continuation of Ser. No. 429,821 now abandoned, filed Sept. 30, 1982, which is related to my co-pending appliction Ser. No. 310,143, filed Oct. 9, 1981, and entitled "Hanging Basket".

BACKGROUND OF THE INVENTION

1. Field of the Invention

This invention relates to improvements in containers for plants and the like and more particularly but not by way of limitation, to an improved hanging basket or basket adapted for being supported from a stand for improving the growth of plants.

2. Description of the Prior Art

Hanging baskets and other type containers for plants are in widespread use today for both interior and exterior use. Many baskets or containers have been devised for supporting the plant from an overhead support such as a ceiling or a tree limb or the like, and these generally make quite an effective and showy means for displaying the plant life. In addition, plants supported above a floor level rather than suspended from a ceiling or the like are also in widespread use and lend themselves to effective decorating of an area. These containers generally have one great disadvantage, however, in that the watering thereof for sustaining the plant is quite difficult. It is common for the water to overflow the container and damage anything which may be disposed beneath the plant, such as a floor, a table or the like. Needless to say, this is a particular disadvantage when the plant is displayed interiorly. Another disadvantage of many of the hanging baskets or baskets supported above a floor or ground level is that the basket is maintained in a more or less common or constant rotational orientation and the plant frequently grows to one side of the container making a "lopsided" overall appearance for the plant. One plant container in particular has been devised for overcoming the static rotational condition of a hanging basket container and is shown in the Espy U.S. Pat. No. 4,227,343, issued Oct. 14, 1980 and entitled "Horticulture Device for Rotating Plants due to Transpiration and Evaporation of Moisture". The Espy et al plant container is provided with spring means responsive to the overall weight of the plant and soil for alternate expansion and contraction to cause rotation of the entire container. As the water evaporates from the soil hosting the plant the container is rotated by the action of the spring. The watering of this container is accomplished by filling a lower tray suspended beneath the main container and the age-old problem of overfilling the container is still present in the Espy et al plant container. A can for retrieving liquid from a container is shown in an old U.S. Pat. No. 1,154,627 issued to E. E. Hall on Sept. 28, 1915. The Hall can comprises a container for fluid and having an opening at the bottom provided with a pitcock having a hose or conduit connected to the outer end thereof. When the pitcock is opened the fluid contained within the housing may be drained through the conduit for other use. This device was particularly developed for use by doctors, nurses and the like and may be the forerunner of present day intravenous feeding devices. In any event, the ageold problem of overwatering and rotating of hanging plants or plants otherwise supported from a lower surface has not been heretofore solved.

The hanging basket disclosed in my aforementioned patent application Ser. No. 310,143, discloses a plant container rotatably supported by a central post the central post being adapted for suspension from a ceiling, tree limb or the like, whereby the natural air flow surrounding the container and acting on the plant hosted thereby causes the entire container and plant to rotate in accordance with the wind acting thereon. This provides a natural action for the plant and results in a very even growth of the plant around the entire container. The plant container or basket disclosed in my prior copending application Ser. No. 310,143 solves the overwatering problem for hanging baskets, but does not solve the problem of overwating of a container supported from a base surface, such as a floor, or the like, rather than being suspended from an overhead structure.

SUMMARY OF THE INVENTION

The present invention contemplates a novel basket or container for supporting a plant in a manner particularly designed and constructed for overcoming the foregoing disadvantages. The basket may be either suspended from a ceiling or other overhead structure or supported from a floor, surface of the ground or the like and comprises a container having a centrally disposed post member extending longitudinally therethrough and rotatably supporting the container with respect thereto. The post member may either extend upwardly from the container for engagement with the overhead support means, or may extend downwardly from the container for engagement with a suitable base means which may support the entire structure from a floor or the like. The novel container is so constructed that either supporting means may be accomplished from a common basket construction. Bearing means is interposed between the support post and the container whereby the entire basket floats or rotates freely as it is supported by the post means. This permits the plant hosed in the container to assume the optimum position with regard to the wind current for protection of the plant and also for turning the plant for even growth in all directions around the basket or container. Another feature of the invention is a quick-connect hose coupling secured directly in the bottom of the container and in open communication with the interior thereof. A length of hose or other conduit means having a mating quick-connect hose coupling provided on one end thereof may be selectively connected with the connection member provided in the bottom of the container when the plant is being watered. The outer end of the hose or conduit may be disposed either within or in alignment with a suitable overflow container for capturing and containing water flowing downwardly through the plant roots and draining from the soil. When the plant stops "leaking" water the hose may be removed. The captured water may be either discarded or may be utilized in a hydroponic effect for watering other plants. Of course, in the event the water is used and reused for watering purposes, it is desirable to add nutrients to the collected fluid between waterings. The novel hanging basket is simple and efficient in construction and economical and durable in use.

BRIEF DESCRIPTION OF THE DRAWINGS

FIG. 1 is a sectional elevational view, partly in elevation, of a plant container embodying the invention and illustrated as supported from a base disposed on a floor surface or the like.

FIG. 2 is a sectional elevational view of a plant container embodying the invention and illustrated as supported from an overhead structure.

DETAILED DESCRIPTION OF THE PREFERRED EMBODIMENT

Figure 3:
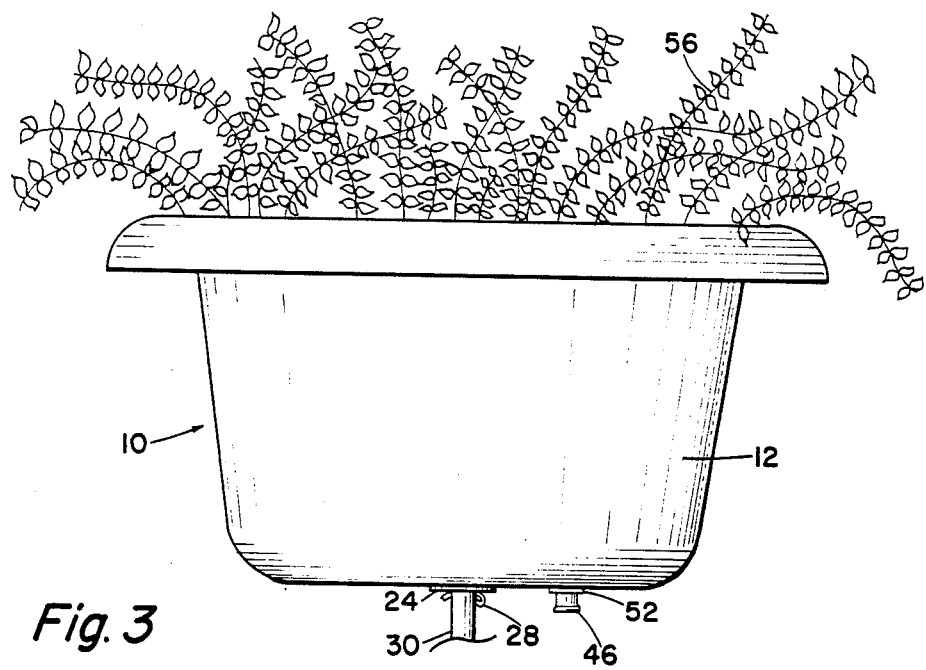
FIG. 3 is a side elevational view of a plant container embodying the invention and having a plant hosted therein.

Referring to the drawings in detail and particularly FIGS. 1 and 3, reference character 10 generally indicates a plant container or basket comprising a container 12 preferably constructed from a transparent material, such as plexiglas or the like, but not limited thereto. A centrally disposed upstanding housing 14 is provided in the interior of the container 12 and may be either integral therewith or secured to the bottom 16 thereof in any suitable manner. The upstanding housing member 14 is preferably substantially cylindrical, but not limited thereto, and tapers inwardly toward the outer end thereof as will be particularly seen in FIGS. 1 and 2. An annular shoulder 18 is provided on the inner periphery of the housing 14 in the proximity of the outer end thereof for supporting suitable bearing means 20. A central bore 22 is provided in the bottom 16 of the container 12 for receiving suitable bearing means 24 therein. Plate means 26 may be secured against the outer race of the bearing means 24 in any suitable manner, such as by a cotter pin 28 whereby the bearing means may be retained in position.

An elongated post or support means 30 extends longitudinally through the housing 14 and through the bearings 20 and 24 for supporting the container 12 in a manner permitting free rotation of the container about the longitudinal axis of the support 30. As particularly shown in FIG. 1, the support post or means 30 extends downwardly from the container 12 and the opposite end thereof is anchored in any suitable or well known manner (not shown) in a base means 32 which is adapted to be positioned or supported from a support surface 34 which may be a floor, ground surface or the like. The upper end 36 of the support post means 30 preferably terminates substantially in alignment with the upper end of the housing 14 as particularly shown in FIG. 1. A suitable sealing cap 38 is disposed over the upper end of the housing 14 and around the outer periphery of the support post 30 for substantially precluding leakage of fluid from the interior 40 of the container 12 into the interior 42 of the housing 14.

An aperture 44 is provided in the bottom 16 of the container 12 for receiving one element 46 of the well known quick-connect hose couplings as in wide use today. The mating element 48 of the quick-connect hose coupling is secured to one end of a suitable hose conduit or the like 50 for releasably connecting the conduit 50 with the quick-connect element 40 for a purpose as will be hereinafter set forth. It is preferable to provide suitable sealing means 52 between the bottom 16 and the quick-coupling element 46 for precluding leakage of fluid therebetween. The outer end of the conduit 50 is preferably disposed either within or in alignment with a suitable liquid receiving receptacle or container 54.

In use, the container 12 is preferably filled with a suitable quantity or potting soil or other host material (not shown) for life support of the plant 56 in the usual or well known manner. The container 12 is supported rotatably in spaced relation above the surface 34 by means of the bearings 20 and 24. As the plant 56 is suspended in this manner, any natural wind currents, either indoors or outdoors, act on the plant 56 and container 12 for creating a natural rotation of the entire container and contents whereby the plant 56 grows in a substantially symmetrical manner about the entire container 12. In order to water the plant 56 it is usually desirable to soak the host soil thoroughly. When this is to be done, the hose or conduit 50 may be connected with the drain port 44 by fastening the element 48 to the element 46 in the usual or well known manner thus establishing communication between the interior of the hose 50 and the interior of the container 12. Water may be directed to the upper surface of the host soil and as the water drains through the soil it is captured at the post 44 and is discharged through the hose 50 and particularly through the open outer end 51 thereof. The open end 51 may be disposed in substantial alignment with or within the overflow container 54 for trapping and storing the water as it is discharged from the hose 50. When the drainage of water from the soil has ceased, or when the plant has stopped "leaking" the element 48 may be easily and quickly removed from engagement with the element 46 and the hose or conduit 50 and overflow container 54 may be moved to the vicinity of another plant for repeating a watering operation in connection therewith. It is to be noted that the contained or captured water within the container 54 may be discarged or may be utilized for the watering or other plants in a hydroponic manner. Of course, in the event the water is used and reused it is preferable or desirable to add nutrients to the water between waterings.

Referring now to FIG. 2, the container 12 is supported by a support means 56 in lieu of the support means 30. The support means 56 comprises an elongated rod or post 58 extending longitudinally through the housing 14 and bearings 20 and 24 and terminating at the lower end slightly outboard of the locking plate 26 and cotter pin 28. The upper end of the rod 58 extends beyond the upper limit 60 of the container 12 and receives suitable hook means 62 at the terminous thereof. The overall length of the rod 58 is sufficient for suspending the container or basket 12 from any suitable overhead support such as a ceiling (not shown) tree limb (not shown) or the like. The hook means 62 may be any suitable type and is preferably constructed of a material complementary to the material from which the rod 58 is constructed, whereby the hook and rod may be "melded" as a unitary structure upon welding or glueing or otherwise securing the two elements together. The operation and utilization of the basket 12 when supported by the support means 56 is substantially identical to that as hereinbefore set forth.

Figure 4:
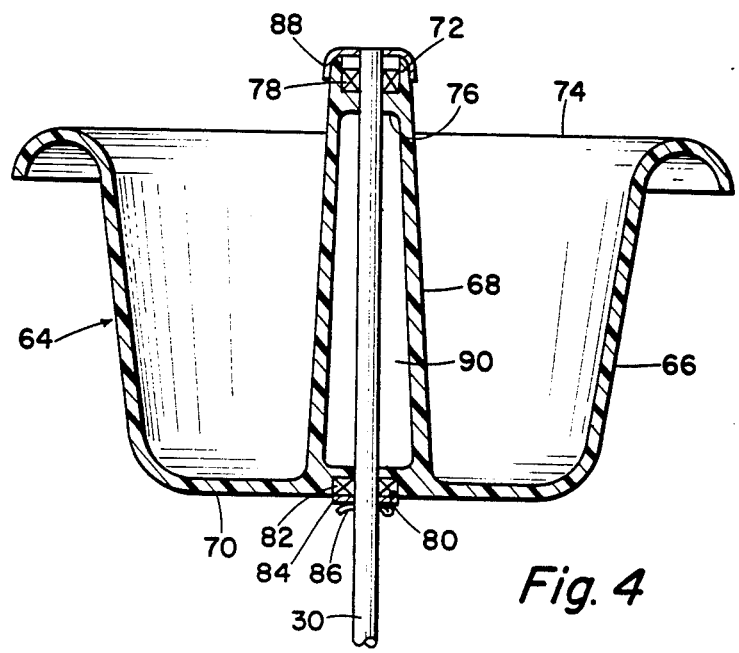
FIG. 4 is a sectional elevational view of a modified plant container embodying the invention.

Referring now to FIG. 4, reference numberal 64 generally indicates a plant container similar to the container 10 and comprising a container 66 for receiving the host soil (not shown) and plant such as the plant 56 therein. A centrally disposed upstanding housing 68 is either integral with or secured to the bottom 70 of the container 66 in much the same manner as the housing 14. The housing 68 is preferably substantially cylindrical but not limited thereto, and preferably tapers inwardly and upwardly as particularly seen in FIG. 4. The upper end 72 of the housing 68 extends beyond the upper limit 74 of the container 66. An annular shoulder 76 is provided on the inner periphery of the housing 68 for supporting suitable bearing means 78. A bore 80 is provided in the bottom 70 of the container 66 for receiving suitable bearing means 82 therein. Suitable support means such as the support means 30 (or the support means 58) extends longitudinally through the housing 68 and through the bearings 78 and 82 in the manner as hereinbefore set forth for rotatably supporting the container 66 with respect to the support means from either a suspended position from an overhead support or a base means positioned on the floor 34 or the like. The bearing 82 is preferably held in position by a suitable annular locking plate 84 and cotter pin 86. It is apparent that the cotter pin also holds the support means in position.

The upper end 72 of the housing 68 is provided with a suitable sealing cap 88 similar to the sealing cap 38 which covers the upper end 72 and surrounds the outer periphery of the support rod 30 to substantially preclude leakage of fluid therearound.

The advantage of having the terminous or upper end 72 of the housing 68 extend beyond the upper limit 74 of the container 66 is that such an arrangement provides a positive precluding of any water utilized during the watering of the plant 56 from entering the interior 90 of the housing 68. This protects the bearings and other operating parts of the container 64 from undue damage due to water contamination. The use of the container 64 whether suspended from an overhead support or the like or supported from a floor ground surface or the like is substantially the same as hereinbefore set forth.

From the foregoing it will be apparent that the present invention provides for a substantially uniform growth of the plant as the entire container rotates in a natural manner in response to wind currents or other pressure forces acting thereon. In addition, the plant may be efficiently watered for producing optimum end results in the growth of the plant, said watering being accomplished in a manner substantially precluding damage to anything disposed in the vicinity of and particularly beneath the hanging plant or suspended plant. The container is essentially weatherproof and may be efficiently utilized for either an indoor or outdoor display of plants.

Whereas the present invention has been described in particular relation to the drawings attached thereto, it should be understood that other and further modifications, apart from those shown or suggested herein, may be made within the spirit and scope of this invention.

What is claimed is:

1. A rotatable container for plants and a host material comprising; a self-contained container means for receiving host material and plant directly therein, sufficient host material within the container means to support a plant, centrally disposed housing means extending longitudinally within the container and adapted to be at least partially enclosed within the host material, nonrotatable support means extending through the housing means for supporting the container means from a support structure in a manner consistent with free rotation of the container means about the stationary longitudinal axis of the support means, drain means provided directly in the lower portion of the container means for directing excess water drained directly from the host material and plant during watering thereof to a site completely out of the container, bearing means interposed between the housing means and support means for providing said free rotation for the container means, and sealing means disposed around the outer periphery of the support means and secured to the housing means for precluding leakage of fluid therebetween.

2. A rotatable container as set forth in claim 1 wherein the outer end of said housing means extends beyond the upper limit of the container for substantially precluding leakage of fluid into the interior of the housing during watering of the plant.

3. A rotatable container for plants as set forth in claim 1 wherein the support means comprises elongated rod means extending through said housing means and terminating at a position below the container, and base means supporting the support means from said support structure.

4. A rotatable container for plants as set forth in claim 1 wherein the support means comprises elongated rod means extending through said housing means and terminating at a position above the container, and hook means disposed at the outer end of the support means for supporting the container from said support structure.

* * * * *